June 30, 1964    M. H. NORMAN    3,139,027
PRINTER MECHANISM
Filed Sept. 18, 1961    6 Sheets-Sheet 1
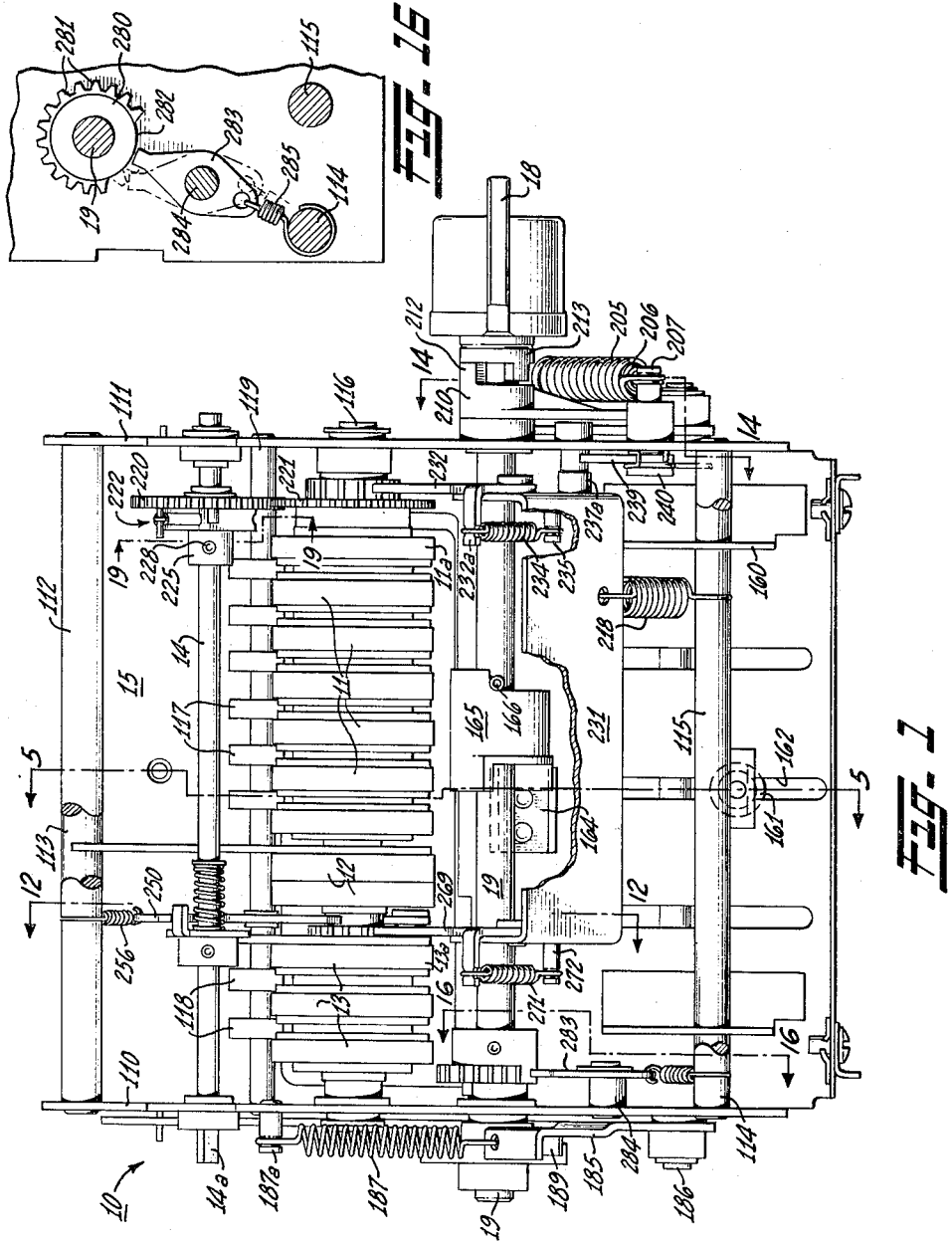
INVENTOR:
MELVIN H. NORMAN
BY
Mellin and Hanscom
ATTORNEYS June 30, 1964 — M. H. NORMAN — 3,139,027
PRINTER MECHANISM
Filed Sept. 18, 1961 — 6 Sheets-Sheet 2
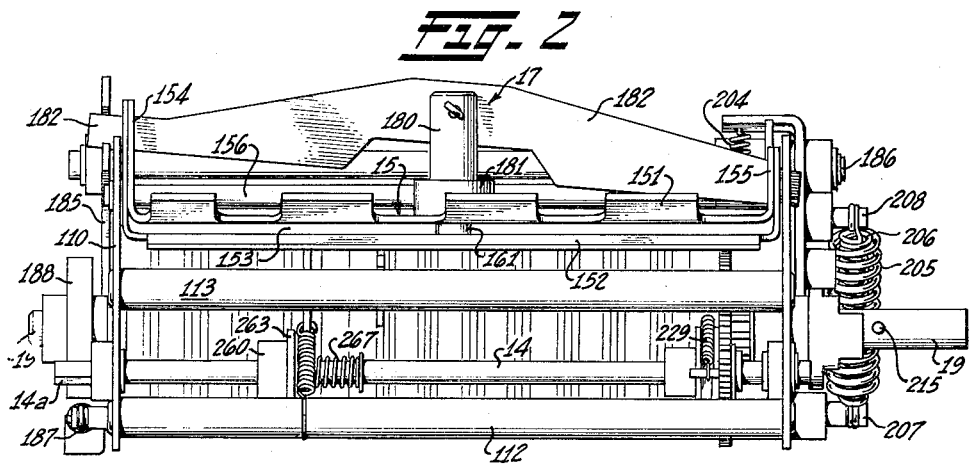
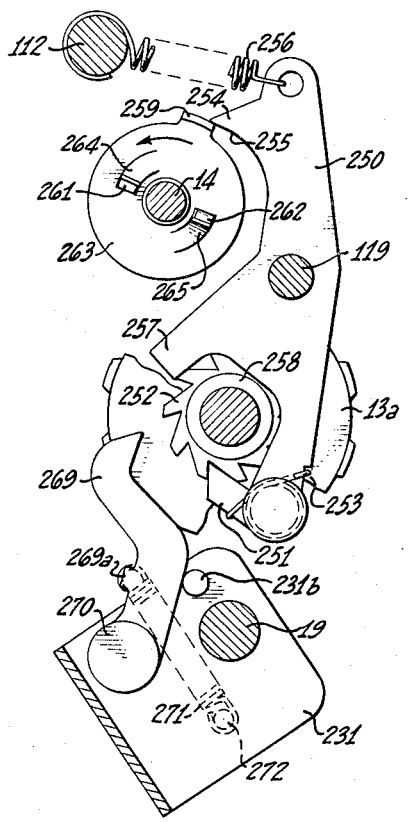
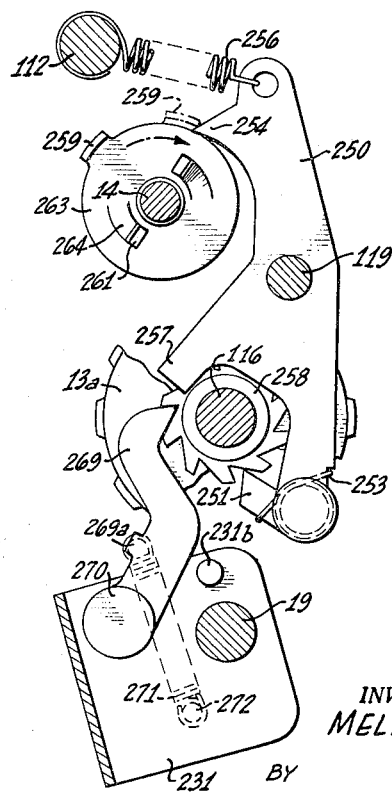
INVENTOR:
MELVIN H. NORMAN
BY Meelin and Hanscom
ATTORNEYS June 30, 1964    M. H. NORMAN    3,139,027
PRINTER MECHANISM
Filed Sept. 18, 1961    6 Sheets-Sheet 3
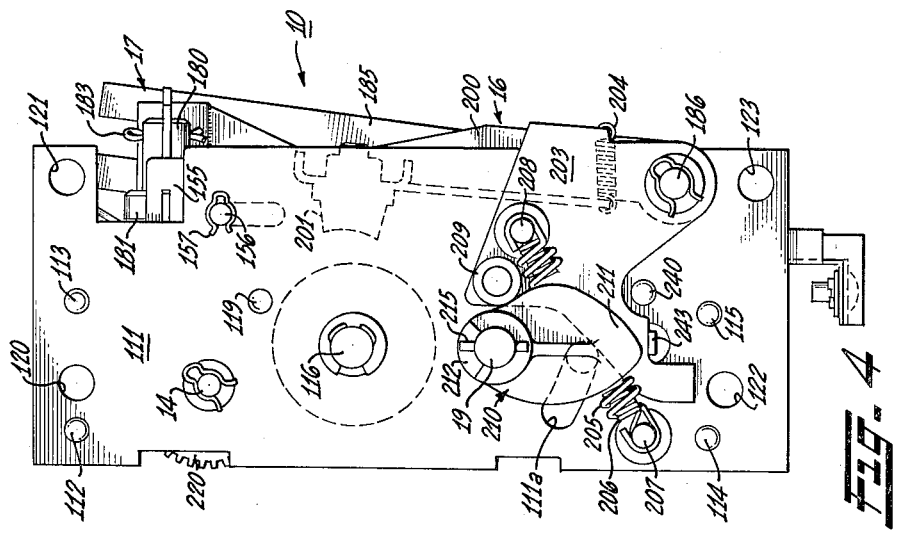
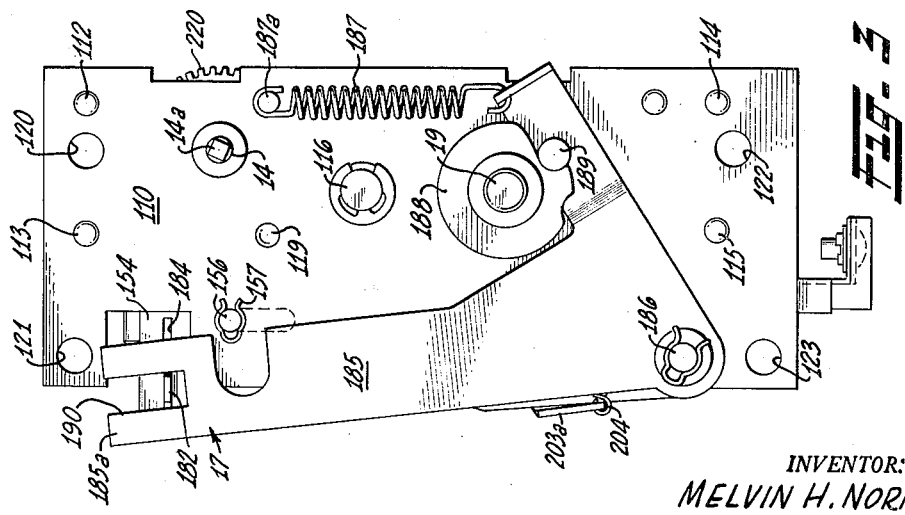
INVENTOR:
MELVIN H. NORMAN
BY
Mellin and Hauscom
ATTORNEYS

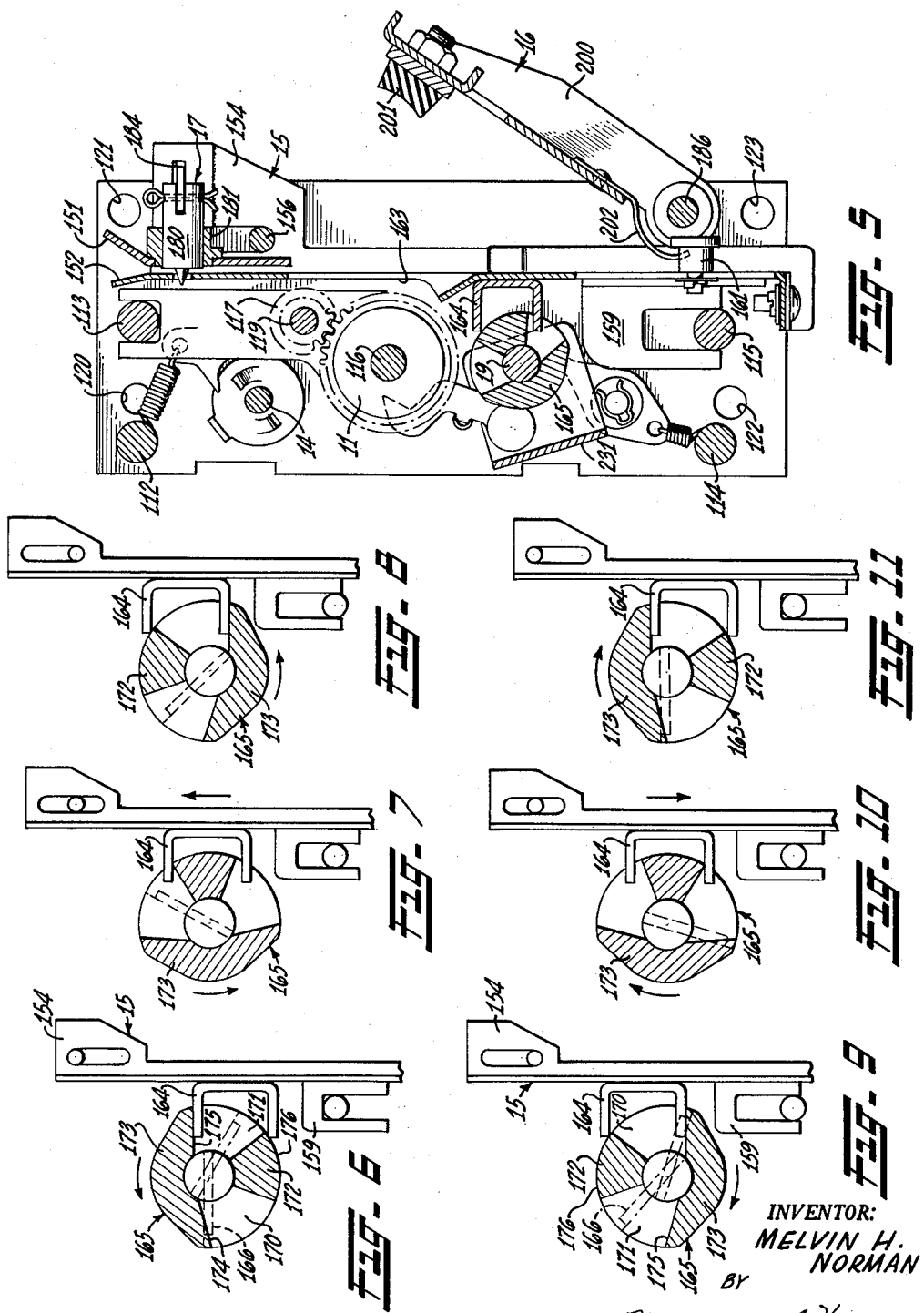

June 30, 1964  M. H. NORMAN  3,139,027
PRINTER MECHANISM
Filed Sept. 18, 1961  6 Sheets-Sheet 5
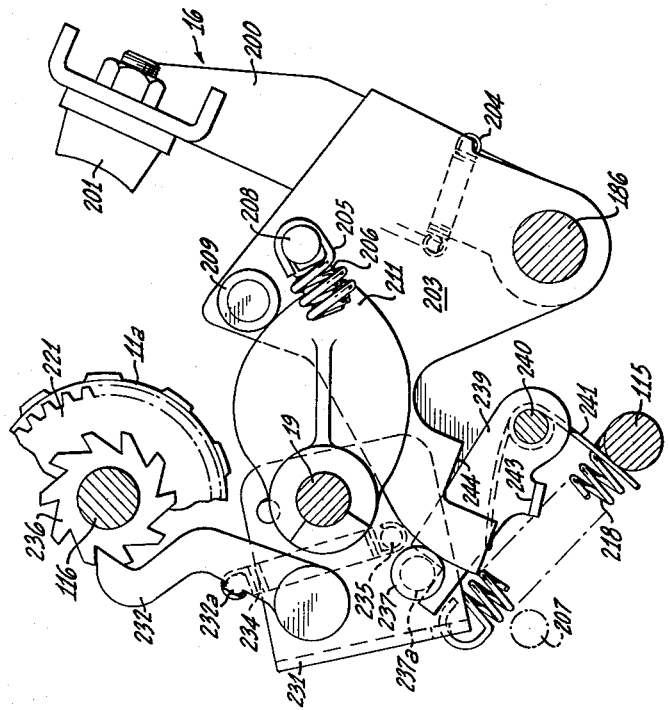
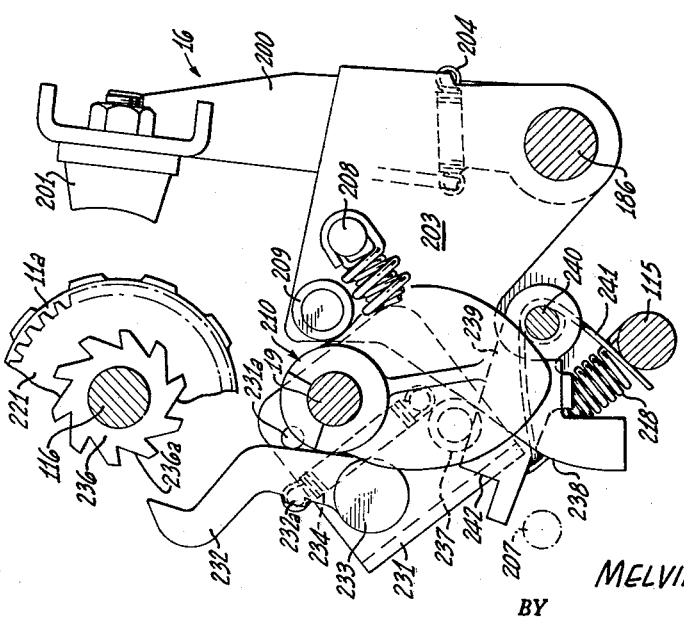
INVENTOR:
MELVIN H. NORMAN
BY
Meelin and Hanscom
ATTORNEYS

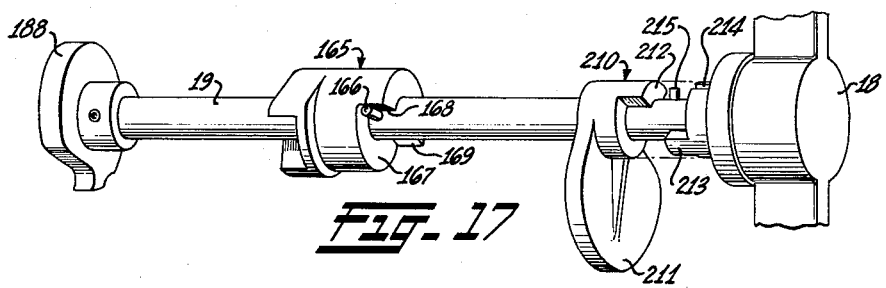
FIG. 17
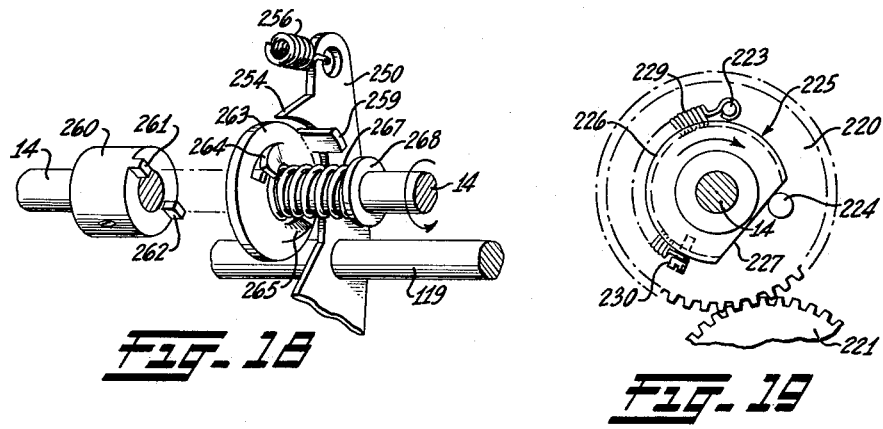
FIG. 18
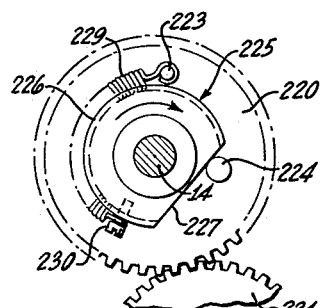
FIG. 19
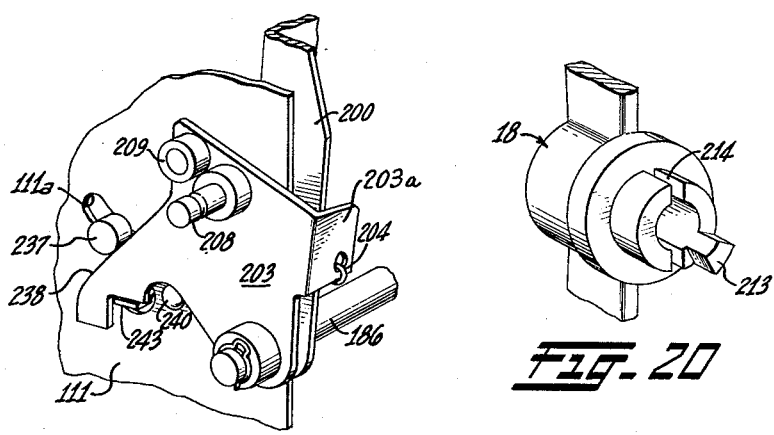
FIG. 21
FIG. 20
INVENTOR:
MELVIN H. NORMAN
BY
Mellin and Hanscom
ATTORNEYS

United States Patent Office 3,139,027
Patented June 30, 1964

3,139,027
PRINTER MECHANISM
Melvin H. Norman, Oakland, Calif., assignor, by mesne assignments, to Rockwell Manufacturing Company, Pittsburgh, Pa., a corporation of Pennsylvania
Filed Sept. 18, 1961, Ser. No. 138,837
31 Claims. (Cl. 101—96)

This invention relates to printer mechanisms and more particularly involves an improved form of apparatus that may be used effectively with fluid meters for recording initial and final printings of a counter on a carbon-backed receipt.

Although many kinds of counter-printer mechanisms are known, nevertheless, it is a primary purpose of the present invention to provide improvements therein which will insure an accurate recording of the number of units delivered through a fluid meter. Also, the particular form of mechanism and apparatus hereinafter described is regarded as providing significant improvements in the mechanical action of counter-printer mechanisms. It will be noted that a complete printing operation may be effectuated by the manual rotation of a control shaft, and depending upon the direction of shaft rotation a ticket support member is accurately positioned for making either the initial or the final print of a meter-driven counter.

Inasmuch as conventional metering counters do not subtract the reverse fluid flow through the meter from the count of the positive fluid flow, certain inaccuracies in recording may arise as a result of inherent reverse flows, which may be caused merely by a rewinding of a delivery hose. Therefore, it is one of the more specific objects of this invention to provide novel structural relationships in a counter-printing mechanism that are especially useful in connection with fluid meters for correctly recording the total number of fluid units actually delivered.

Another object is to provide a printer apparatus for meters that will accurately record the number of fluid units delivered through a meter and having a consecutive number wheel that is partly advanced toward the next number by a positive direction of meter rotation, but wherein said wheel is not advanced by negative or reverse meter operations.

Another object of the invention is to provide a novel printing mechanism having a drive shaft adapted to be driven by a fluid delivery meter. The printing mechanism has gallonage print wheels which are driven by the drive shaft as long as the meter is delivering fluid to indicate the total amount of fluid delivered. The printing mechanism also includes consecutive number print wheels which will advance one full number position only for each operation of the drive shaft in a forward direction by the meter, regardless of how many times the drive shaft rotates forwardly for any particular delivery. To accomplish this, the consecutive number print wheels are advanced only partially from one full number position to the next full number position by forward rotation of the drive shaft, regardless of how many complete rotations the drive shaft may make. After the drive shaft stops following a fluid delivery, the consecutive number print wheel is advanced from its partially advanced position to the next higher full number position by a manually operable control shaft, the manual rotation of which is utilized to cause a ticket to be printed with the gallonage delivered and the consecutive number of the particular delivery. Although the term "gallonage print wheel" is used in the claims, it should be realized that this term is for convenience only, and that the printing mechanism could be calibrated in other fluid units, such as liters, imperial gallons and the like.

Another object of this invention is to provide a novel printer mechanism for recording the before and after positions of a counter, and more especially including a ticket support actuating mechanism comprising a cam sector mounted upon a rotating camshaft for positively moving and retaining said ticket support in a proper position for making initial and final recordings.

It is a further object of this invention to provide a novel printer mechanism for recording the before and after positions of a counter and more especially, including an improved print actuating device comprising a pivotally mounted printer hammer that is operated by a single cam lobe which may be rotated in first one direction and then the other by a control shaft, which shaft may also be utilized to operate a ticket punch and to position a ticket support relative to the printing wheels of said counter.

A still further object of this invention is to provide a novel print mechanism for recording the position of a counter and more especially including means for advancing printing wheels from partial to fully-numbered positions by the pivotal movement of a printer hammer.

Other objects of this invention will become apparent in view of the following detailed description.

In the drawings forming a part of this application and in which like parts are identified by like reference numerals throughout the same, FIG. 1 is a front elevation of a preferred embodiment of the printer mechanism which incorporates the improvements as contemplated by this invention;

FIG. 2 is a top plan view of the mechanism shown in FIG. 1;

FIG. 3 is the left side elevation of the mechanism as shown in FIG. 1;

FIG. 4 is the right side elevation of the mechanism as shown in FIG. 1;

FIG. 5 is a section taken on lines 5—5 of FIG. 1;

FIGS. 6–11 are diagrammatic illustrations of the ticket support actuating mechanism, showing various of its positions during operation;

FIGS. 12–13 are enlarged detail views of the consecutive number advance mechanism, substantially as viewed along lines 12—12 of FIG. 1;

FIGS. 14 and 15 are enlarged detail views of the printer actuating mechanism and means for advancing the units counter printing wheel to a full number position, substantially as viewed along lines 14—14 of FIG. 1;

FIG. 16 is a detail view of the unidirectional control mechanism as viewed along lines 16—16 of FIG. 1;

FIG. 17 is a perspective view of the control shaft and its supported control elements which are operated in a sequential order by rotation of a manually operated control handle;

FIG. 18 is a perspective and partially exploded view of the clutch mechanism employed for partly advancing the units consecutive number wheel during the first positive rotation of a meter shaft;

FIG. 19 is a detail view of the resilient lost motion connection intermediate the meter drive shaft and the counter printing wheels, substantially as viewed along lines 19—19 of FIG. 1;

FIG. 20 is a perspective view of the operating handle for the control shaft, showing its construction for operative connection to said shaft and for operating the printing control cam; and FIG. 21 is a perspective view of a portion of the printer hammer assembly.

General Description

Referring to FIGS. 1–5, there is shown a preferred form of counter-printing machine 10 having incorporated therein the various improvements that characterize the present invention. In general, machine 10 includes a framework having spaced side plates 110 and 111 and four connecting spacer rods 112, 113, 114 and 115, each rod being secured to the side plates by peening their ends. Upon this framework, and coaxially mounted intermediate plates 110 and 111, are a series of counter-printing or gallonage print wheels 11, including units wheel 11a, two letter-bearing printing wheels 12, and a series of consecutive number printing wheels 13, including units wheel 13a. Counter-printing wheels 11 are operatively connected to and rotated by a drive shaft 14, adapted to be driven by a fluid meter (not shown), and the consecutive number printing wheels 13 are partly advanced one number position by the first positive rotation of shaft 14 following a printing operation. The gallonage print wheels 11 and consecutive number print wheels 13 are provided, as is customary, with circumferentially spaced and consecutively arranged numerical indicia thereon. The letter-bearing printing wheels 12 are provided for the purpose of identifying the printer mechanism from which any ticket recording has been made. Therefore, it will be understood that the positions of wheels 12 are pre-set by the proprietor and are not affected by an operation of meter-driven shaft 14, or by an operation of the printer mechanism to be described. All of the printing wheels are supported upon a shaft 116 and each of the series printing wheels 11 and 13 is interconnected, respectively and in series, by Geneva drive mechanisms comprising advancement pinions 117 and 118, all of said pinions being freely rotatable upon a support shaft 119. A Geneva drive arrangement of this type is shown and described in United States Patent No. 2,086,363.

Printing machine 10 also comprises a movable ticket support assembly 15 for supporting and positioning a carbon-backed receipt or ticket (not shown) between the printing wheels and a printer hammer assembly 16. It will become apparent, if not already evident, that an actuation of hammer assembly 16 would force a supported ticket against the printing wheels recording the contacted printing wheel members and letters upon the carbon-backed receipt.

A ticket punch assembly 17 is further provided in the printing machine 10 for retaining the ticket in a fixed position relative to ticket support assembly 15. Assembly 17 is mounted to the ticket support 15, and is movable therewith as said ticket support is shifted between "before metering" and "after metering" positions.

Although the printing machine 10 is primarily intended to be used with a fluid meter, no such meter is shown since the meter does not constitute a material part of the invention and its illustration might tend to confuse the following detailed description of parts or their illustration. But, as a preliminary matter it will be seen that a conventional type of meter may be operatively connected to the key end 14a of drive shaft 14. Also, aligned openings 120, 121, 122 and 123 are formed in each of the side plates 110 and 111 for mounting machine 10 to a housing or a support.

While a complete explanation of each operation will be indicated following a detailed description of the specific actuated mechanisms, it may be well to point out at this time that the wheel mechanisms 11 and 13 and assemblies 15, 16 and 17 are controlled by rotative movement of a manually operated wing handle 18, supported upon a control shaft 19. Furthermore, it is to be understood that handle 18 is operated before and after a metering operation so as to record the "before" and "after" settings of the counter wheels. In general, an operator inserts a carbon-backed ticket into the machine 10 and makes an initial print before any fluid is dispensed through the meter. The carbon-backed ticket is retained in the printing mechanism until after a given metering operation has been completed and a second or final print is made.

Ticket Tray Assembly

FIGS. 2 and 5–11 best illustrate the ticket support or tray assembly 15, said assembly essentially comprising a pair of spaced channel plate members 151 and 152, which define a ticket slot 153 therebetween. Plate members 151 and 152 are secured together along abutting sides, which provide slotted ears 154 and 155 near their upper extremities for mounting the tray upon a trasverse guide rod 156. Rod 156 extends between side plates 110 and 111 and is held in place by wire clips 157. Tray assembly 15 is also supported in a reciprocally movable manner near the bottom of plate 152 by a pair of slotted appendages 159 and 160, the slot of each appendage receiving connecting rod 115 as a guide. Thus, it will be apparent that the tray assembly is mounted to the framework but may be moved between the extreme positions illustrated by FIGS. 4 and 5.

Tray assembly 15 includes a button stop 161 that is adjustably positionable along a vertical slot 162 in plate 152. Any ticket inserted into the tray would be moved against the button stop, thereby positioning the ticket relative to the printing wheels. It will also be evident in view of FIG. 5 that plate 152 is formed with a large opening 163 directly opposite from the printing wheels. Thus, upon actuation of the printer hammer assembly 16 a supported ticket would be pressed through opening 163 and into engagement with the printing wheels.

This invention especially contemplates a novel tray assembly actuating mechanism comprising a U-shaped bracket 164 secured to plate 152 and a cam 165 rotatably mounted upon control shaft 19. Cam 165 is adapted to be driven by a pin 166 pressed into an opening through shaft 19. But since cam 165 is formed with an axial sector recess 167, best shown in FIG. 17, shaft 19 may be rotated without rotating the cam while the pin 166 is moved between surfaces 168 and 169 of the recess. The purpose of this lost motion, it will be seen, is to provide movement of cam 165 during one portion only of control shaft operation.

While recess 167 is formed axially in one end of cam 165, the other end is provided with axial sector grooves 170 and 171, thereby defining a cam sector 172 and a portion 173 having stopping surfaces 174 and 175 spaced equal angular distances on opposite sides of sector 172. As shown in FIGS. 5–11, cam sector 172 is disposed between the legs of U-shaped bracket 164, and when cam 165 is rotated by shaft 19, sector 172 will engage bracket 164 causing it and the tray assembly to be moved linearly. Since the peripheral surface 176 of sector 172 is circular, the bracket 164 will be moved to a predetermined position and retained while the cam continues to be rotated. However, before cam sector 172 can be rotated beyond a position of engagement with bracket 164, either stopping surface 174 or 175 comes into engagement with the opposite leg of bracket 164, thereby limiting the rotational turning of cam 165 and preventing it from drifting ahead of control shaft rotation.

FIGS. 5–11 illustrate various positions of ticket tray actuation and are representative of a complete cycle of operation. FIG. 6 indicates the initial relationship of parts after a ticket is first inserted into the printer mechanism and before an initial print is made. As the control shaft 19 is rotated for operating a printing cycle, pin 166 is brought into engagement with surface 169 of cam 165 causing said cam to be rotated. FIGS. 5 and 7 indicate intermediate positions of operation, showing how the tray assembly is moved; and FIG. 8 illustrates the relationship of parts with the tray assembly in a fully raised position at the time a "before metering" print is being made, or shortly thereafter.

The ticket remains in the tray assembly 15 during a metering operation, during which time all actuating parts of assembly 15 remain substantially as shown in FIG. 8. However, after completion of a fluid delivery a second recording is taken of the printing wheels. Such a recording is again initiated by rotation of control shaft 19, but in a reverse direction of rotational movement. As shown in FIG. 9, pin 166 is first moved from surface 169 through the recess 167 and into engagement with surface 168. Continued movement of shaft 19 causes cam 165 to be moved through the intermediate position of FIG. 10 and back to the start position of FIG. 11. Furthermore, it is to be understood that shortly after tray assembly 15 is moved downwardly into the position of FIG. 11 control shaft 19 will also effectuate the "after metering" print of the printing wheels.

*Ticket Punch*

Ticket punch assembly 17 is utilized to hold a ticket within machine 10, and in a fixed position from the time that the "before metering" print is initiated to the time that the "after metering" print has been completed. Assembly 17 comprises a cylindrical punch member 180 reciprocally mounted in a guide sleeve 181 secured to plate 151 of the tray assembly 15. Punch member 180 is pinned to an actuating lever 182 by a cotter pin 183, said lever being pivotally fixed at one end in an opening through ear 155 and extending through a guide slot 184 in ear 154. Lever 182 is arranged to be pivoted upon ear 155 by a lever 185 having a bifurcated end 185a that engages that end of lever 182 which extends through slot 184. Lever 185, in turn, is pivoted upon a transverse support rod 186 and is adapted to be moved by a spring member 187 secured to pin 187a and a control cam 188 mounted upon control shaft 19. Control cam 188, it will be noted, engages a roller-follower 189 secured to lever 185 and spring 187 holds follower 189 against the surface of cam 188.

In the start position, as shown by FIGS. 1–4, lever 185 occupies a punch-retracting position, being held in this position by spring 187. It will be evident, however, that upon initial turning of shaft 19 (in a clockwise direction as viewed in FIG. 3) the peripheral surface of cam 188 will force follower 189 clockwise relative to the axis of rod 186, thereby causing lever 185 to be moved against spring 187, pivotally moving lever 182 and causing punch member 180 to be moved into a ticket engaging position. Lever 185 will be retained in this punch actuating position until cam 188 is returned to its original position, but this does not occur until completion of both "before metering" and "after metering" prints have been taken. Furthermore, it will be recognized that while tray assembly 15 is being reciprocally moved, lever 182 moves therewith although it is held in a punch-actuating condition by the guiding hold surface 190 of bifurcated end 185a.

*Printer Hammer Assembly*

The printer hammer assembly 16 is also controlled by manual rotation of control shaft 19, and it will be apparent that each printing operation is performed sequentially with the actuation of other mechanisms and assemblies of machine 10.

Assembly 16 comprises a hammer lever 200 pivotally supported upon transverse support rod 186 and having a hard rubber hammer head 201. Lever 200 also supports a leaf spring member 202 that engages a ticket and holds it in position while the hammer is being actuated. The specific construction of the hammer lever 200 and supported members may be regarded as conventional, since it does not pertain to the present invention and various printer hammers of this kind have previously been used.

A hammer bracket 203 is also pivotally supported upon rod 186 for moving the hammer lever 200 in a printing cycle of operation. Bracket 203 and lever 200 are resiliently interconnected by spring 204 which normally holds lever 200 against an ear 203a of bracket 203 as shown in FIGS. 3 and 21.

Bracket 203 is normally urged into position shown by FIGS. 4 and 14 by relatively strong coiled and concentric spring members 205 and 206, each spring being secured to a post 207 mounted to side plate 111 and hooked about a projection 208 on the bracket. In this position, a roller-follower 209 secured to bracket 203 is held against the peripheral surface of a control cam 210, said cam having a single cam lobe 211 and rotatably mounted upon control shaft 19. When and as cam 210 is rotated, roller 209 is forced outward, moving bracket 203 against the tension of springs 205 and 206. Furthermore, it will be apparent that roller 209 may be engaged by either side of cam lobe 211, depending upon the direction of cam rotation.

Cam 210 is adapted to be rotated by direct engagement with the manually operated handle 18, and for this purpose its hub portion is formed with an axial sector 212, as shown in FIGS. 1, 4 and 17. Handle 18 is also formed with an axial hub sector 213 which engages sector 212 for certain portions of rotational movement. However, it will be evident that the two sectors 212 and 213 together cover much less than a full 360° of control shaft 19, and as a consequence handle 18 may be rotated in part without effecting a rotational movement of cam 210 for a portion of its operation.

But handle 18 is also provided with a slot 214 for receiving a pin 215 that is pressed through control shaft 19. In a completed assembly of the handle 18 to the shaft 19, pin 215 is received in slot 214 and, therefore, any rotational movement of the handle is transmitted to the shaft.

The relationship of handle 18 to cam 210, or more especially, the relationship between their respective hub sectors 213 and 212 is such that there is some lost motion between those members as the handle is rotated at the beginning of a printing operation. Moreover, once cam lobe 211 is driven past its high point of engagement with follower 209, cam 210 is free to overrun or drift forwardly of control handle movement. It will be seen, therefore, that the printing bracket 203 may be snapped forwardly with cam 210 by the tension in springs 205 and 206 as soon as follower 209 passes over the high point of cam lobe 211.

*Metering Drive Connection and First Counter Wheel Connection*

Referring again to FIG. 1, drive shaft 14 is operatively connected to gallonage print wheels 11 through a pair of intermeshed gears 220 and 221 and further including a resilient lost motion connection, generally indicated by reference number 222. The particular relationship of these parts is shown in FIG. 19, wherein gear 220 is rotatably mounted upon meter-driven shaft 14 and is provided with pin members 223 and 224 positioned radially outward from the axis of shaft 14. Gear 221 is rotatably mounted upon shaft 16 and is operatively connected to the first counter wheel 11a. Since gears 220 and 221 are in mesh with each other, any rotational movement of one is transmitted to the other.

As it will be seen, either a forward or backward rotation of shaft 14 will be transmitted to gear 220 for operating the first counter wheel 11a through gear 221. But since meter-driven shaft 14 is randomly positioned at the completion of any metering operation, there is no guaranty that counter wheel 11a would be positioned in a full number position for making a proper imprint. The term "full number position" as applied to the gallonage print wheel 11a means that the wheel is in a position whereby a number on the wheel is aligned relative to the printer hammer assembly for making an imprint on the ticket held by the ticket support. If the wheel 11a is not so aligned, such that a full, single number would be imprinted, then the wheel would not be in a full number position. For this reason, means is provided to insure that 11a is properly positioned during a printing operation. However, this necessarily requires some advancement of the counter wheel 11a from any position other that a full number position. Inasmuch as meter shaft 14 should not be advanced, since it is intended that shaft 14 should be positively connected to a meter, the resilient lost motion connection 222 is incorporated. This connection allows counter wheel 11a, gear 221 and gear 220 to be resiliently advanced relative to shaft 14 into positional relationships of a full number during a printing operation.

The resilient lost motion connection 222 comprises a hub member 225 having a grooved semicircular peripheral surface 226 and a flattened or relieved surface 227. Hub member 225 is affixed to shaft 14 by a setscrew 228, and a spring 229 interconnects pin member 223 with a setscrew 230 on the hub member. Spring 229 occupies the grooved surface 226 of hub 225, normally urging gear 220 about the hub until pin 224 engages the flattened surface 227, as shown in FIG. 19.

Now, in the normal forward driving rotation of shaft 14, its movement is transmitted to gear 220 through the engagement of surface 227 with pin 224. If shaft 14 and its driven counter wheel 11a should be stopped in other than full number positions, wheel 11a may nevertheless be advanced for making an imprint without imparting movement to shaft 14, since gear 220 may be moved forwardly against the resilient tension in spring 229. It will become evident that after a printing operation is completed the means employed for advancing wheel 11a to a full number position is released, and at this time spring 229 will return gear 220, gear 221 and wheel 11a to the driven positions from which they had been advanced.

Although the normal direction of movement for shaft 14 is as indicated in FIG. 19, it will be seen that a reverse driving connection between hub 225 and gear 220 may be established. Thus, in the event that reverse flows are passed through the meter to which shaft 14 is connected, the count recorded upon print wheels 11 is decreased. In this instance spring 229 will be tensioned and tend to reversely move gear 220 in accordance with reverse movement of hub 225. However, spring 229 need not transmit the entire drive, and is in fact a relatively weak spring. The greatest burden of the reverse drive is taken by the engagement of pin 224 with the opposite side of flattened surface 227.

FIGS. 14 and 15 best illustrate the actuating means for advancing counter wheel 11a from a randomly oriented position into a full number position to make a proper imprint. This actuating means comprises a correction bracket 231 that is pivotally supported upon shaft 19, but independently movable with respect thereto. Bracket 231 pivotally supports a pawl 232 upon a hub 233; and a spring 234, attached to an arm 232a of the pawl and anchored to a post 235 on bracket 231, tends to rotate pawl 232 clockwise against a pin stop 231a as shown in FIGS. 14 and 15. Pawl 232 is positioned for engaging a ratchet wheel 236 having ten teeth and attached to counter wheel 11a upon shaft 116.

Bracket 231 is pivotally actuated by a spring 218 and by movement of hammer bracket 203; and a roller member 237 is provided on bracket 231 in the path of hammer bracket movement. Roller 237 is supported upon a pin 237a which projects through a slot 111a of side plate 111. Hammer bracket 203 is especially provided with a cam surface 238 against which roller 237 is held by spring 218 as the bracket is actuated in a printing cycle of operation, FIG. 15. Furthermore, it will be evident that clockwise movement of bracket 231, as shown, initially causes pawl 232 to engage the nearest tooth surface 236a of ratchet wheel 236. Continued clockwise movement of bracket 231 and pawl 232 will force the pawl and ratchet wheel to assume the positions illustrated in FIG. 15; and if the ratchet wheel does not occupy a full number position, it will be advanced into the next full number position. Spring 234 resiliently holds pawl 232 against ratchet wheel 236, but allowing it to move counterclockwise upon axis 233, in order to assume its proper positional relationship relative to ratchet wheel 236.

Means is also provided for retaining pawl 232 in its ratchet wheel engaging position during completion of the printing operation. Thus, printing wheel 11a is effectively immobilized until an imprint thereof has been made. For this purpose a spring pressed detent 239 is provided. Detent 239 is pivotally supported upon a pin support 240 and is held against the pin 237a, which supports roller 237, by a spring 241. Also, detent 239 is formed with a stepped shoulder 242 and a projecting lip 243.

In operation, and as bracket 231 is pivoted by the camming action of surface 238 against roller 237, pin 237a moves outward along the surface of detent 238. When bracket 231 and pawl 232 have been fully actuated, shoulder 242 will move under pin 237a, FIG. 15, thereby retaining pawl 232 in a ratchet wheel engaging position. This relationship is not maintained until hammer bracket 203 returns to its original position, and after the printing operation is essentially completed. It will be evident that detent 238 is kicked out from engagement with pin 237a by hammer bracket 203 when a surface 244 on said bracket comes into contact with lip 243. All parts would then assume their original positions as shown in FIG. 14, spring 218 returning correction bracket 231 to its start position.

*Consecutive Number Wheel Advancement*

Counter wheels 13, as previously described, are employed for recording the number of meter operations conducted; and the number indicated by wheels 13 is fully advanced one consecutive number each time an imprint of the printing wheels is made following a metering operation. It will become apparent that wheels 13 are fully advanced to the next consecutive number in a two-step operation. First, the units wheel 13a is partly advanced by the first positive rotation of meter-driven shaft 14. Then, upon operation of control shaft 19 and shortly before taking an imprint of the printing wheels, the units wheel 13a is further advanced into its next full number position. For the purpose of describing and claiming the operation of consecutive number wheels 13, the movement of partly advancing wheel 13a is referred to as an advancement less than one full number position; and each "full number position" is a position where a number on the wheel is aligned relative to the printer hammer assembly for making an imprint. Thus, an advancement less than one full number position is a movement of wheel 13a less than required to orient wheels 13 to the next sequential number.

Referring to FIGS. 1, 12, 13 and 18 in particular, there is shown a ratchet mechanism for initially, but only partly, advancing wheel 13a and comprising an arm 250 pivotally mounted upon support shaft 119. Arm 250 in turn supports a spring pressed pawl 251, offset upon a pivot 250a and biased toward a ratchet wheel 252 by torsion spring member 253. Ratchet wheel 252 is attached to the units wheel 13a upon shaft 116 and possesses ten teeth. Arm 250 is also provided with a detent portion 254 having a camming surface 255. A spring member 256 anchored to rod 112 pivotally urges arm 250 in a counter clockwise direction; but such movement is limited by an engagement between finger extension 257 and a cylindrical stop 258 mounted on shaft 116.

Arm 250 is adapted to be moved against spring 256 by a camming member 259 during the positive rotation of meter-driven shaft 14. However, member 259 is rotated through an overrunning clutch device which is disengaged when and if shaft 14 is reversely driven. The clutch device comprises a driving member 260 having engagements 261 and 262 and a driven member 263 having recessed camming surfaces provided by semicircular vanes 264 and 265. Member 260 is attached to meter shaft 14 by a setscrew 266 but driven member 263 is freely rotatable upon shaft 14, being urged toward the driving member by a spring 267 seated against a spring clip 268.

It will be seen, in view of FIGS. 12 and 18 especially, that engagements 261 and 262 will operatively engage driven member 260 when shaft 14 is rotated counterclockwise, as shown, causing camming member 259 to move across surface 255 and pivot arm 250. However, if shaft 14 is driven clockwise, member 259 will come into engagement with detent portion 254 (as indicated by broken lines in FIG. 13) and engagements 261 and 262 will then overrun upon the camming surfaces of vanes 264 and 265 of driven member 263, forcing member 263 against spring 267. Thus, it will be evident that an operative drive connection between members 260 and 263 will be established for only positive metering operations. Furthermore, it should be noted that arm 250 is pivoted clockwise each time the metering shaft 14 is rotated, thereby forcing pawl 251 into the position shown in FIG. 12. But it is only the first rotation of shaft 14 which actually advances the ratchet wheel 252, since the pawl 251 will pick up a different tooth of the ratchet wheel only after said wheel has been advanced into a full number position, as shown by FIG. 13.

The second stage of advancing wheel 13a, whereby said wheel is moved into a full number position, is performed by a pawl mechanism that is substantially the same as that employed for advancing the counter wheel 11a to its next whole number. In fact, correction bracket 231 is again utilized for supporting a second pawl 269 and imparting movement thereto in timed sequence with the printing operation, as effectuated by manual rotation of handle 18 and control shaft 19. Pawl 269 is pivotally supported upon a hub 270, and a spring 271 anchored to a post 272 and to an arm 269a of the pawl urges said pawl against a stop pin 231b.

The operation of pawl 269 is similar to that of counter advancement pawl 232. However, it will be understood that there would be no advancement of the ratchet wheel 252 unless the meter shaft 14 has been operated to cause a partial advancement of that ratchet wheel; and ratchet wheel 252 (and units print wheel 13a) are only advanced by the first printing cycle of operation following positive meter shaft rotation. In the event that there has been no meter shaft rotation since the last ratchet advancement, pawl 269 will, nevertheless, be placed into engagement with the same ratchet tooth upon movement of bracket 231, thereby locking the print wheels 13 during the printing operation. This would be the normal occurrence for each "before metering" print, since presumably there would be no fluid dispensed in the interim periods after a completely recorded metering operation and the next succeeding recorded operation. Of course, if there has been any metering following the final printing of a complete meter recording, then the next cycle of printing would cause the consecutive number printing wheels 13 to be advanced. Thus, an examination of the ticket receipts would indicate whether or not metering all deliveries had been properly recorded upon a delivery ticket.

*Operation and Sequential Control*

FIGS. 1–4 and 17 illustrate the normal position of all parts before a ticket has been placed in the printing mechanism and prior to a metered delivery. As a first step, a carbon-backed ticket or receipt is placed through the ticket slot 153 of tray assembly 15. Then a "before metering" imprint of the printing wheels is made by a counterclockwise rotation of handle 18, taken with reference to FIG. 17.

The entire movement of handle 18 is transmitted to control shaft 19 through the pin and slot connection 214–215, and as a consequence punch operating cam 188 is immediately rotated upon the initial movement of the handle.

It will be noted that neither the tray actuating cam 165 nor the printing control cam 210 is operated until pin 166 engages surface 169 and hub sector 213 contacts hub sector 212. Once actuated, punch assembly 17 remains in that condition until handle 18 is returned to its original or starting position following a completion of the "after metering" print operation. Therefore, during the punching operation tray assembly 15 and the printer hammer assembly 16 remain idle. Continued counterclockwise movement of handle 18 will, however, operate the tray actuating cam 165 (in the manner shown in FIGS. 6–8) and also the printing control cam 210 and actuated brackets 203, 231. Before roller 209 on bracket 203 arrives at the high point of cam lobe 211, tray assembly 15 will be effectively moved to a raised position. But after roller 209 passes around the high point of cam lobe 211 the printer hammer will be moved against the ticket and print wheels, thereby making a "before metering" recording of the print wheels in the proper position on the supported and punched ticket.

With handle 18 and control shaft 19 in fully counterclockwise rotated positions, a metered delivery is conducted, causing shaft 14 to be rotated and in turn moving counter print wheels 11 and partly advancing consecutive number print wheel 13a. Following the metered delivery, and with shaft 14 idle, handle 18 is rotated clockwise. Corresponding movement of cam 165 operates tray assembly 15 to its lower position (FIGS. 9–11), and shortly thereafter the crest of cam lobe 211 passes under roller 209 and a second or "after metering" imprint is made. By completing the clockwise movement of handle 18, punch assembly 17 is then retracted to a ticket releasing position.

*Unidirectional Control*

The above described functions and particularly the movement of control shaft 19 are restricted by a ratchet control mechanism, which prevents a return movement of parts after partial rotation of handle 18. This mechanism comprises a ratchet wheel 280 rigidly mounted upon control shaft 19. The greater portion of wheel 280 is formed with teeth 281 but a small peripheral area 282 is free of teeth, allowing the ratchet wheel to be turned without contacting a detent member 283, which is pivotally supported upon a stud 284. Detent 283 is biased toward a neutral position by a spring 285.

It will be seen that the neutral bias imposed by spring 285 is normally directed through the pivot axes of ratchet wheel 280 and detent 283, but the bias is shifted to an off-center position when the detent is engaged by a tooth 281, thereby tending to return the detent toward its neutral position. After the leading teeth at each end of the toothed portion of wheel 280 pass over the top edge of detent 283, a blocking angle is formed with each succeeding tooth, restricting further rotation of ratchet wheel 280 to a continued movement in the same rotational direction. However, after a complete rotation of shaft 19 and ratchet wheel 280, area 282 will become aligned with detent 283 and said detent will then return to its neutral position.

Ratchet wheel 280 may now be reversely rotated to complete the cycle of operation, and again detent 283 insures a proper rotation of the control shaft 19 and handle 18 after the first end tooth 280 passes over the detent's top edge.

Although a preferred embodiment for a printer mechanism has been shown and described, it will be apparent that various changes may be made without departing from the spirit of the invention or the scope of the attached claims, and each of such changes is contemplated.

Having thus described my invention, what I claim and desire to secure by Letters Patent is:

1. A printer mechanism comprising: a frame; a drive shaft journaled in said frame for forward and backward rotation; a gallonage print wheel journaled for rotation in said frame and having circumferentially spaced and consecutively arranged numerical printing indicia; means connecting said drive shaft to said gallonage print wheel for turning said wheel forwardly or backwardly in response to forward or backward rotation of said drive shaft respectively; a consecutive number print wheel journaled for rotation in said frame for indicating the cycle of forward rotation of said drive shaft, said consecutive number print wheel having circumferentially spaced and consecutively arranged numerical printing indicia; means operated by a forward rotation of said drive shaft for rotatively advancing said consecutive number print wheel forwardly less than one full number position towards the next higher full numbered position; means preventing said consecutive number print wheel from rotating backwardly upon a backward rotation of said drive shaft; manual means operable upon completion of rotation of said drive shaft and including a rotatable control shaft operable upon partial rotation thereof for rotatively advancing said consecutive number print wheel forwardly from the partial position thereof to said next higher full number position and for assuring that said gallonage print wheel is rotatively positioned at a full number position; and ticket pressing means for pressing a ticket against the numerical printing indicia on both said gallonage and consecutive number print wheels.

2. The apparatus of claim 1 and further including means operable by further rotation of said control shaft to operate said ticket pressing means to press a ticket against said printing indicia on said wheels.

3. The apparatus of claim 1 wherein said means connecting said drive shaft to said gallonage print wheel includes a lost-motion means for allowing said gallonage print wheel to be advanced to a full number position while said drive shaft is motionless and before the operation of said ticket pressing means by said control shaft.

4. The apparatus of claim 1 and further including a movable ticket support, means mounting said support in proximate relation to said gallonage and consecutive number print wheels for reciprocating movement of said support between two positions relative to said print wheels, and means operable upon rotation of said control shaft for reciprocally moving said ticket support from one of its positions to the other position thereof while rotation of said control shaft is initiating a printing operation by moving said ticket pressing means.

5. The apparatus of claim 4 wherein said means for assuring that said gallonage print wheel is rotatively positioned at a full numbered position, and said actuating means for reciprocally moving the ticket support from one of its positions to the other position thereof while initiating a printing operation are operated by rotative movement of said control shaft, whereby an imprint is made upon said ticket by rotating said control shaft in first one rotative direction and then the other, said ticket support being moved to properly position a ticket for recording prints before and after operation of said drive shaft.

6. A printer mechanism comprising: a frame; a drive shaft rotatively journaled in said frame; a gallonage print wheel rotatively journaled in said frame and having circumferentially spaced numerical printing indicia; means connecting said drive shaft to said gallonage print wheel for rotating said wheel in response to rotation of said drive shaft; a movable ticket support; means mounting said support in proximate relation to said print wheel for reciprocating movement of said support between first and second positions relative to said print wheel; ticket pressing means for pressing a ticket supported in said ticket support against the printing indicia of said print wheel; a control shaft journaled in said frame for forward and backward rotation; actuating means operated by forward rotation of said control shaft for moving said ticket support to said first position thereof and for initiating a printing operation by moving said ticket pressing means, said actuating means being operable by backward rotation of said control shaft for moving said ticket support to said second position thereof and for initiating a printing operation by moving said ticket pressing means; and means operable by initial forward or backward rotation of said control shaft for assuring that said gallonage print wheel is rotatively positioned at a full number position prior to operation of said ticket pressing means by said control shaft.

7. A printer mechanism of claim 6 wherein said means connecting said drive shaft to said gallonage print wheel includes a lost-motion means for allowing said gallonage print wheel to be advanced to a full number position while said drive shaft is motionless and before the operation of said ticket pressing means.

8. A printer mechanism comprising: a frame; a drive shaft journaled in said frame for forward and backward rotation; a gallonage print wheel journaled for rotation in said frame and having circumferentially spaced numerical printing indicia; means connecting said drive shaft to said gallonage print wheel for turning said wheel forwardly or backwardly in response to forward or backward rotation of said drive shaft respectively; a consecutive number print wheel journaled for rotation in said frame for indicating the cycle of forward rotation of said drive shaft, said consecutive number print wheel having circumferentially spaced and consecutively arranged numerical printing indicia; means operated by a forward rotation of said drive shaft for rotatively advancing said consecutive number print wheel forwardly less than one full number position towards the next higher full number position; means preventing said consecutive number print wheel from rotating backwardly upon a backward rotation of said drive shaft; a movable ticket support; means mounting said support in proximate relation to said print wheels for reciprocating movement of said support between first and second positions relative to said print wheels; ticket pressing means for pressing a ticket supported in said ticket support against the printing indicia of said print wheels; a control shaft journaled for rotation in said frame; means operable by forward rotation of said control shaft for moving said ticket support to the first position thereof and for initiating a printing operation by moving said ticket pressing means, said actuating means being operable by backward rotation of said control shaft for moving said ticket support to said second position thereof and for initiating a second printing operation by moving said ticket pressing means; and means operable by rotation of said control shaft upon partial rotation thereof for rotatively advancing said consecutive number print wheel forwardly from the partial position thereof to said next higher full number position thereof prior to the operation of said ticket pressing means by said control shaft.

9. A printing mechanism as set forth in claim 8 and including means for preventing forward movement of said consecutive number print wheel by said control shaft when said consecutive number print wheel is in a full number position.

10. A printing mechanism as set forth in claim 8 and further including means operable by initial forward or backward rotation of said control shaft for assuring that said gallonage print wheel is rotatively positioned at a full number position prior to operation of said ticket pressing means by rotation of said control shaft.

11. In a printer mechanism: a frame; a drive shaft journaled in said frame for forward and backward rotation; a gallonage wheel journaled for rotation in said frame and having circumferentially spaced numerical indicia thereon; means connecting said drive shaft to said gallonage wheel for turning said wheel forwardly or backwardly in response to forward or backward rotation of said drive shaft respectively; a consecutive number wheel journaled for rotation in said frame for indicating the cycle of forward rotation of said drive shaft, said consecutive number wheel having circumferentially spaced consecutive numerical indicia; means operated by a forward rotation of said drive shaft for rotatively advancing said consecutive number wheel forwardly less than one full number position towards the next higher full number position; means preventing said consecutive number wheel from rotating backwardly upon a backward rotation of said drive shaft; a control shaft journaled in said frame for rotation; means operable in response to a rotation of said control shaft after a cycle of forward rotation of said drive shaft for rotatively advancing said consecutive number wheel forwardly from the partial position thereof to which it had been advanced by a forward rotation of said drive shaft to said next higher full number position.

12. The mechanism of claim 11 wherein said gallonage wheel and consecutive number wheel are also print wheels and wherein said indicia thereon are printing indicia, and further including ticket pressing means for pressing a ticket against the numerical printing indicia on both of said wheels, and means operable by rotation of said control shaft for actuating said ticket pressing means after said consecutive number wheel has been rotatively advanced by initial rotation of said control shaft into said next higher full number position.

13. The mechanism of claim 12 and further including means for holding said consecutive number wheel in its advanced full number position during operation of said ticket pressing means.

14. The mechanism of claim 11 wherein said means operated by a forward rotation of said drive shaft for rotatively advancing said consecutive number wheel comprises a ratchet wheel mounted on said consecutive number wheel for advancing said consecutive number wheel, a rocker arm pivotally mounted proximate said ratchet wheel, a pawl pivotally mounted on said rocker arm and biased against said ratchet wheel, resilient means urging and pivotally moving said rocker arm with pawl relative to said ratchet wheel, and means operated by forward rotation of said drive shaft for pivotally moving said rocker arm with pawl against said resilient means and advancing said ratchet wheel less than one full number position.

15. The mechanism of claim 14 and further including means resiliently pivoting and urging said pawl against said ratchet wheel.

16. The mechanism of claim 14 wherein said rocker arm provides a surface engagement for limiting pivotal movement by said resilient means, thereby retaining said pawl in ratchet engaging positions.

17. The mechanism of claim 14 wherein said rocker arm is formed with a bifurcated arm portion and is pivotally mounted upon an axis parallel to the mounting axis of said ratchet wheel, said bifurcated arm portion having two ends straddling the axis of said ratchet wheel, and said pawl being pivotally mounted upon one of said ends, the other end of said bifurcated arm portion providing a surface engagement, and further including stop means providing a circular cylindrical surface mounted coaxially upon the axis of said ratchet wheel for limiting pivotal movement of said rocker when engaged by said surface engagement.

18. The mechanism of claim 14 wherein said means operated by forward rotation of said drive shaft includes a unidirectional clutch on said drive shaft, a cam member driven through said clutch and engageable with said rocker arm, said cam member causing said rocker arm to be pivoted once for each complete forward cam rotation.

19. The mechanism of claim 18 wherein said rocker arm provides a stopping surface and a camming surface, said camming member engaging said camming surface and pivoting said rocker arm upon forward rotation of said drive shaft and engaging said stopping surface upon backward rotation of said drive shaft, said unidirectional clutch effecting a disconnection between said drive shaft and said cam member while said cam member is being urged against said stopping surface.

20. A printing mechanism for meters including a frame supporting a drive shaft and having a print wheel adapted to be rotated by operation of said drive shaft, said print wheel having circumferentially spaced consecutive numerical printing indicia, said printing mechansm including an improved printer actuating device therefor comprising: a printer hammer pivotally mounted to said frame and adapted for striking toward and against said print wheel, resilient means urging said printer hammer toward said print wheel, a control shaft journaled in said frame for forward and backward rotation, a cam mounted upon said control shaft for movement therewith and having a symmetrical cam lobe for engaging said printer hammer and moving it against the force of said resilient means, said cam lobe having a central high point allowing said hammer to be moved rapidly toward said print wheel under the force of said resilient means as the cam is moved either forwardly or backwardly by the control shaft and the cam lobe engagement passes around said high point, and means operable by initial rotation of said control shaft for assuring that said print wheel is in a full number position as said cam lobe engagement approaches said high point from either direction.

21. The apparatus of claim 20 wherein said cam is freely pivoted upon said control shaft, and further including a crank lever mounted upon said control shaft, means providing driving and lost-motion connection between said crank lever and cam whereby said cam may be operatively rotated by said crank lever until said cam lobe passes around said high point engagement, said means also allowing said cam to continue past said high point engagement without causing said crank lever to be rotated.

22. The apparatus of claim 20 and further including interengaging means on said control shaft and said cam for driving said cam by and in the direction of rotation of said control shaft, whereby said cam lobe is turned first in one rotative direction by forward rotation of said control shaft and then in the opposite rotative direction by backward rotation of said control shaft for actuating said printer hammer.

23. The apparatus of claim 20 wherein said means for assuring that said print wheel is in a full number position includes a ratchet wheel mounted coaxially with and to said print wheel, a pawl support bracket pivotally mounted from said frame, a pawl member pivotally mounted to said bracket, means resiliently urging said pawl toward said ratchet wheel, and means by said cam for pivoting said pawl bracket with pawl toward said ratchet wheel as said printer hammer is moved by said cam away from said print wheel.

24. The apparatus of claim 23 and further including spring means resiliently urging said pawl bracket away from said ratchet wheel and normally effecting a disengagement between said pawl and ratchet wheel.

25. The apparatus of claim 23 and further including means for locking said pawl member into engagement with said ratchet wheel in a full number position of said print wheel before said cam lobe engagement passes around said high point, and means for releasing said pawl from locking engagement with said ratchet wheel upon substantial completion of printer hammer actuation.

26. The apparatus of claim 25 wherein said locking means comprises a detent member pivotally mounted from said frame and having a stepped shoulder, means pivotally biasing said detent and urging said shoulder into engagement with said pawl bracket, said engagement being moved longitudinally of said shoulder by pivotal movement of said pawl bracket.

27. The apparatus of claim 26 and further wherein said detent member provides a contactible surface disposed in the path of printer hammer movement, said contactible surface being struck by said printer hammer upon substantial completion of a printing operation, whereby said detent is thereby moved against said pivotal biasing means and releasing said pawl bracket.

28. In a printer assembly for making initial and final prints of a counter mechanism and having a movable support for a ticket, an actuating mechanism for said ticket support comprising: means for reciprocally mounting said movable support in proximate relation to said counter mechanism, means providing a pair of stop members affixed to said movable support and spaced longitudinally of each other relative to the direction of reciprocal mounting, a rotatable camshaft, and a cam mounted on said camshaft and having a cam sector disposed intermediate said stop members, said cam sector having a semi-circular peripheral surface generated from the axis of said cam shaft, the peripheral surface being adapted for engaging either one of said stop members, depending upon the direction of camshaft rotation, to hold said ticket support in a predetermined position while said cam sector is moved with lost motion.

29. The apparatus of claim 28 and further including means rotatably mounted with said cam sector for engaging said stop members and limiting the degree of cam sector rotation, said last named means engaging the opposite stop member from the stop member engaged by said cam sector.

30. The apparatus of claim 28 and further including a printer actuating shaft, and means for rotating said cam sector during the initial turning of said printer actuating shaft and permitting lost motion therebetween after said movable support has been moved into its other position.

31. In a printer assembly for making initial and final prints of a counter mechanism and having a movable support for a ticket, an actuating mechanism for said ticket support comprising: means for reciprocally mounting said movable support in proximate relation to said counter mechanism, a substantially U shaped bracket having a pair of arms and being affixed to said movable support, said arms being spaced longitudinally of each other relative to the direction of reciprocal mounting, the extended ends of said arms providing surface engagements, and a rotatably mounted cam sector disposed intermediate said surface engagements and having a peripheral surface for engaging either one of said surface engagements depending upon the direction of camshaft rotation and holding said ticket support in a predetermined position.

References Cited in the file of this patent
UNITED STATES PATENTS

| | | |
|---|---|---|
| 1,766,745 | Griffith | June 24, 1930 |
| 2,086,363 | McMullen | July 6, 1937 |
| 2,127,243 | Berck | Aug. 16, 1938 |
| 2,612,428 | Vroom | Sept. 30, 1952 |
| 2,977,045 | Pandozy | Mar. 28, 1961 |
| 3,044,662 | Wright et al. | July 17, 1962 |